United States Patent
Oizumi et al.

(10) Patent No.: US 8,391,649 B2
(45) Date of Patent: Mar. 5, 2013

(54) IMAGE FILTER METHOD

(75) Inventors: Munenori Oizumi, Ibaraki (JP); Osamu Koshiba, Ibaraki (JP); Satoru Yamauchi, Ibaraki (JP)

(73) Assignee: Texas Instruments Incorporated, Dallas, TX (US)

(*) Notice: Subject to any disclaimer, the term of this patent is extended or adjusted under 35 U.S.C. 154(b) by 3260 days.

(21) Appl. No.: 10/633,159

(22) Filed: Aug. 1, 2003

(65) Prior Publication Data

US 2005/0025382 A1 Feb. 3, 2005

(51) Int. Cl.
*G06K 9/32* (2006.01)

(52) U.S. Cl. .................................................. 382/300

(58) Field of Classification Search ............ 382/269, 382/263, 266, 300, 262
See application file for complete search history.

(56) References Cited

U.S. PATENT DOCUMENTS

| | | | | |
|---|---|---|---|---|
| 5,054,100 A * | 10/1991 | Tai | | 382/300 |
| 6,339,451 B1 * | 1/2002 | Tults | | 348/569 |
| 6,592,523 B2 * | 7/2003 | Avinash et al. | | 600/443 |
| 6,928,196 B1 * | 8/2005 | Bradley et al. | | 382/300 |
| 7,023,487 B1 * | 4/2006 | Adams | | 348/448 |

* cited by examiner

*Primary Examiner* — Matthew Bella
*Assistant Examiner* — Dennis Rosario
(74) *Attorney, Agent, or Firm* — Mirna Abyad; W. James Brady; Frederick J. Telecky, Jr.

(57) ABSTRACT

Nonlinear image filter defined by local edge intensity and slope and is useful noise and artifact removal during image processing; applications include digital still cameras and video cameras.

5 Claims, 5 Drawing Sheets

Figure 3a (unfiltered sloping lines)

Figure 3b (filtered sloping lines)

IMAGE FILTER METHOD

CROSS-REFERENCE TO RELATED APPLICATIONS

The following patent applications disclose related subject matter: application Ser. No. 11/677,846, filed Feb. 22, 2007, and 60/804,464, filed Jun. 12, 2006. These referenced applications have a common assignee with the present application.

BACKGROUND OF THE INVENTION

The invention relates to image processing, and more particularly to image filtering methods and related devices such as digital and video cameras.

There has been considerable growth in the sale and use of digital cameras, both still and video, in recent years. FIG. 4 is a block diagram of a typical digital still camera which includes various image processing components, collectively referred to as an image pipeline. Color filter array (CFA) interpolation, gamma correction, white balancing, color space conversion, and JPEG (or MPEG for video) compression-decompression constitute some of the key image pipeline processes. The typical color CCD consists of a rectangular array of photosites (pixels) with each photosite covered by a color filter: e.g., red, green, or blue. Thus to recover a full-color image (all three colors at each pixel), a method is required to calculate or interpolate values of the missing colors at a pixel from the colors of its neighboring pixels. Such methods lead to artifacts in the full color image which should be removed by filtering.

Similarly, high-frequency elements of video images are commonly eliminated using conventional linear filters. However, the size of such filters becomes large when the desired characteristics are demanding, and this results in prohibitively large circuit size.

Infinite impulse response (IIR) filtering is often used in acoustical signal processing. However, it is little used in image processing due to its side effects, which are often imperceptible in sound but apparent in images.

Filtering using the matching method compares input signals with a stored database and outputs appropriate signals. Although this method works well in some situations, the output quality can be low if the database does not match the input. Also, this method consumes large amounts of memory and computational power.

SUMMARY OF THE INVENTION

The present invention provides image processing methods and systems with filtering using estimates of edge intensity and direction to smooth parallel to an edge.

This has advantages including enhanced quality of image.

BRIEF DESCRIPTION OF THE DRAWINGS

The drawings are heuristic for clarity.

FIGS. 3a-3b show experimental results.

DETAILED DESCRIPTION OF THE PREFERRED EMBODIMENTS

1. Overview

Figure 1:
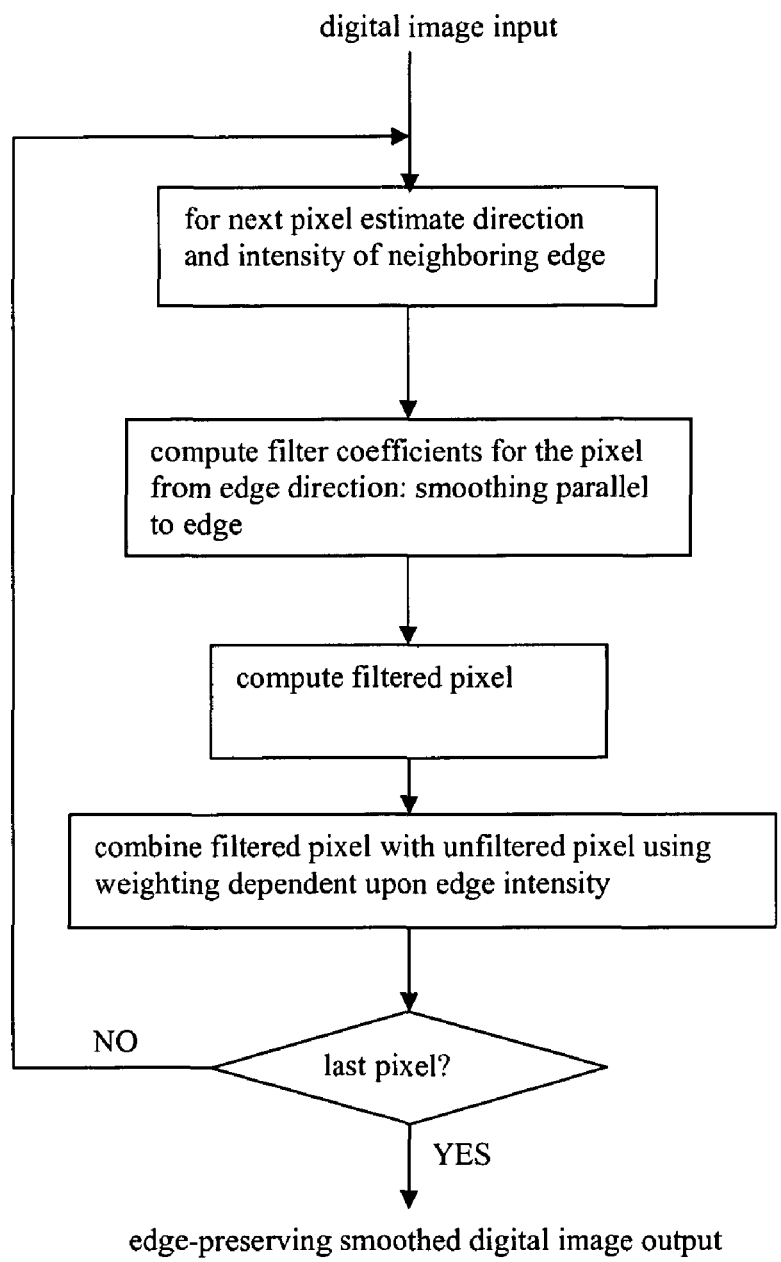
FIG. 1 is a flow diagram for a preferred embodiment method.

Preferred embodiment image filtering methods include defining a non-linear filter by first determining at each pixel any neighboring edge direction and strength, and then defining filter coefficients for such pixel by roughly rotating a one-dimensional smoothing filter to align with the edge. That is, the filter coefficients adapt to the pixel's edge environment. Filtering the image with this pixel-dependent filter preserves edges and smoothes noise and artifacts paralleling edges. FIG. 1 is a flow diagram. The methods allow relatively small filters (e.g., 5×5) and simple computations to provide high quality output; this permits use of small buffer memory together with low MIPS on a programmable processor and/or simple hardwired circuitry.

Preferred embodiment digital image processing systems (such as cameras) include preferred embodiment image filtering methods.

Figure 4:
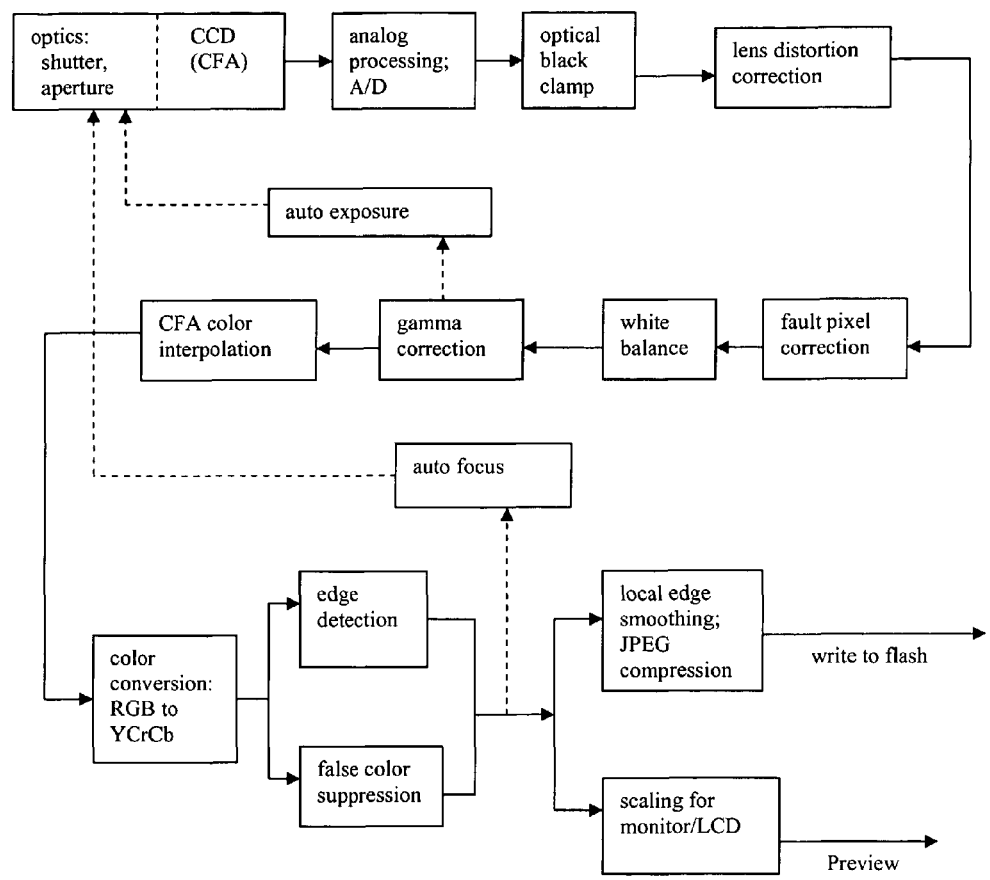
FIG. 4 is a block diagram of a digital camera system.

FIG. 4 shows in functional block form a system (camera) which may incorporate preferred embodiment methods, such as in the edge detection block. The functions of preferred embodiment systems can be performed with digital signal processors (DSPs) or general purpose programmable processors or application specific circuitry or systems on a chip such as both a DSP and RISC processor on the same chip with the RISC processor as controller. Further specialized accelerators, such as CFA color interpolation and JPEG encoding, could be added to a chip with a DSP and a RISC processor. Captured images could be stored in memory either prior to or after image pipeline processing. The image pipeline functions could be a stored program in an onboard or external ROM, flash EEPROM, or ferroelectric RAM for any programmable processors.

2. First Preferred Embodiment

FIG. 1 is a flow diagram of first preferred embodiment filtering methods which include the following steps to define filter coefficients for filtering an image. Let p(n,m) denote the pixel value at pixel location (n,m) in the image: the first index indicates the column measured from left to right and the second index indicates the row measured from bottom to top. Note that p(n,m) could represent luminance, chrominance, red, green, blue, magenta, etc.

Figure 2A:
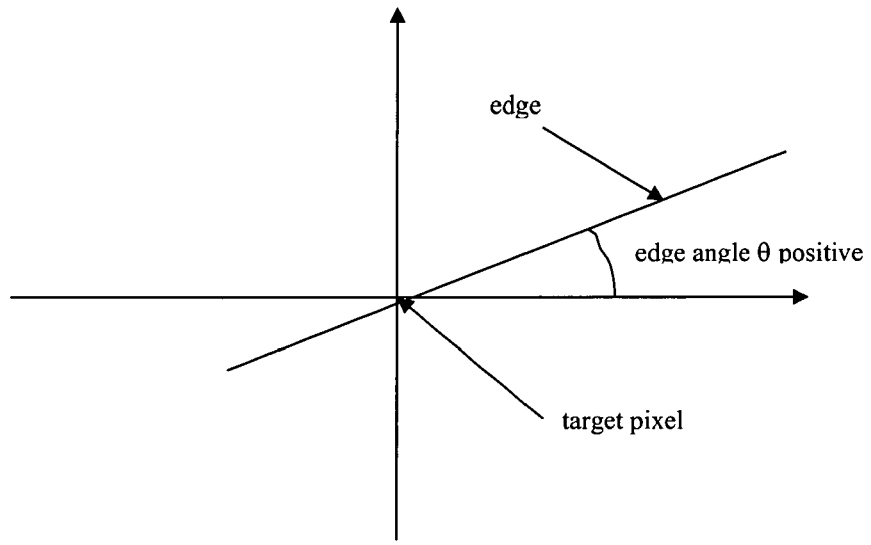
FIGS. 2a-2b illustrate edges.
Figure 2B:
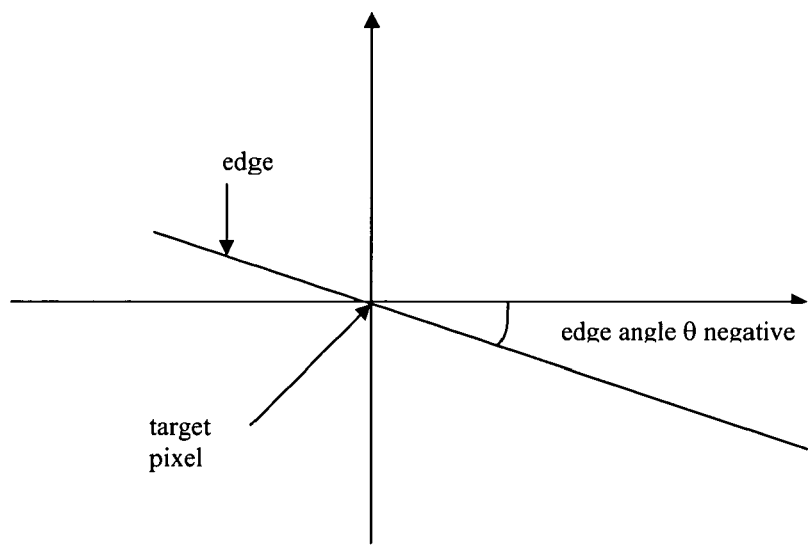

(1) First, for location (n,m) estimate the direction and intensity of any nearby edges. In particular, consider 5×5 neighborhoods of pixels for edge estimations, and compute horizontal ($d_x$) and vertical ($d_y$) variations at (n,m) as follows.

$$d_x(n,m)=\Sigma_{-2\leq j\leq 1,-2\leq k\leq 2}a(j,k)|p(n+j,m+k)-p(n+1+j,m+k)|$$

$$d_y(n,m)=\Sigma_{-2\leq j\leq 2,-2\leq k\leq 1}a(k,j)|p(n+j,m+k)-p(n+j,m+1+k)|$$

with the coefficients a(j,k) as:

$$a(j,k) = \begin{bmatrix} 1 & 2 & 2 & 1 \\ 2 & 4 & 4 & 2 \\ 4 & 8 & 8 & 4 \\ 2 & 4 & 4 & 2 \\ 1 & 2 & 2 & 1 \end{bmatrix}$$

where the lower left coefficient is a(−2,−2) and the upper right coefficient is a(1,2) Thus $d_x(n,m)$ measures the variation of p(.,.) in the x direction about (n,m) and $d_y(n,m)$ measures the variation in the y direction. If there is an edge at (n,m), then the discontinuities in p(.,.) across the edge dominate the sums. Thus define the edge intensity at (n,m), I(n,m), to be the maximum of $d_x(n,m)$ and $d_y(n,m)$, and estimate the edge angle, θ, as illustrated in FIGS. 2a-2b, by $\pm\arctan(d_x/d_y)$.

To account for the sign of θ, two diagonal variation measures for the same 5×5 neighborhood of (n,m) are defined: $d_l$ (measures variation across edges as in FIG. 2a) and $d_r$ (measures variation across edges as in FIG. 2b), as follows:

$$d_l(n,m)=\Sigma_{-2\leq j\leq 1,-2\leq k\leq 1}b(j,k)|p(n+1+j,m+k)-p(n+j,m1+k)|$$

$$d_r(n,m)=\Sigma_{-2\leq j\leq 1,-2\leq k\leq 1}b(j,k)|p(n+j,m+k)-p(n1+j,m1+k)|$$

where the coefficients b(j,k) are:

$$b(j,k) = \begin{bmatrix} 1 & 2 & 2 & 1 \\ 2 & 4 & 4 & 2 \\ 2 & 4 & 4 & 2 \\ 1 & 2 & 2 & 1 \end{bmatrix}$$

where the lower left coefficient is b(−2,−2) and the upper right coefficient is b(1,1). Then estimate the sign of θ as positive if $d_l \geq d_r$ and negative if $d_l \leq d_r$.

(2) The foregoing computations $d_x(n,m)$, $d_y(n,m)$, $d_l(n,m)$, and $d_r(n,m)$ provide estimations of edge angle and intensity and are used to create the 5×5 filter matrix to apply to the image at (n,m). Essentially, the 5×5 filter matrix will be an approximate rotation of the following 5×5 x-direction-smoothing filter which preserves horizontal edges:

$$M = (1/16)\begin{bmatrix} 0 & 0 & 0 & 0 & 0 \\ 0 & 0 & 0 & 0 & 0 \\ 2 & 4 & 4 & 4 & 2 \\ 0 & 0 & 0 & 0 & 0 \\ 0 & 0 & 0 & 0 & 0 \end{bmatrix}$$

Note that M would be used unchanged for a pixel at an edge with slope θ=0.

First, the range of θ is partitioned into 8 intervals, and each interval has a 5×5 filter matrix which approximates a rotation of M by essentially weighting the matrix elements according to tan θ of the element location. For convenience define $r=d_x/d_y=\tan|\theta|$; then the 8 filter matrices are as follows:

(a) For $0 \leq r \leq 1/2$ and $d_l \geq d_r$ (corresponding to $0 \leq \theta \leq \arctan(1/2)=26.6°$), the 5×5 filter matrix is:

$$M[n,m](j,k) = (1/16)\begin{bmatrix} 0 & 0 & 0 & 0 & 0 \\ 0 & 0 & 0 & 4r & 2(2r) \\ 2(1-2r) & 4(1-r) & 4 & 4(1-r) & 2(1-2r) \\ 2(2r) & 4r & 0 & 0 & 0 \\ 0 & 0 & 0 & 0 & 0 \end{bmatrix}$$

where the [n,m] index denotes the matrix applies to the neighborhood centered at (n,m) and the (j,k) index denotes the location within the matrix with $-2\leq j\leq 2$ and $-2\leq k\leq 2$.

(b) For $1/2 \leq r \leq 1$ and $d_l \geq d_r$ (corresponding to $26.60° \leq \theta \leq 45°$), the 5×5 filter matrix is:

$$M[n,m](j,k) = (1/16)\begin{bmatrix} 0 & 0 & 0 & 0 & 2(2r-1) \\ 0 & 0 & 0 & 4r & 2(2-2r) \\ 0 & 4(1-r) & 4 & 4(1-r) & 0 \\ 2(2-2r) & 4r & 0 & 0 & 0 \\ 2(2r-1) & 0 & 0 & 0 & 0 \end{bmatrix}$$

(c) For $1 \leq r \leq 2$ and $d_l \geq d_r$ (corresponding to $45° \leq \theta \leq 63.4°$), the 5×5 filter matrix is the matrix of (b) with r replaced by 1/r and the matrix reflected across its lower-left to upper-right diagonal; that is:

$$M[n,m](j,k) =$$
$$(1/16)\begin{bmatrix} 0 & 0 & 0 & 2(2-2/r) & 2(2/r-1) \\ 0 & 0 & 4(1-1/r) & 4/r & 0 \\ 0 & 0 & 4 & 0 & 0 \\ 0 & 4/r & 4(1-1/r) & 0 & 0 \\ 2(2/r-1) & 2(2-2/r) & 0 & 0 & 0 \end{bmatrix}$$

(d) For $2 \leq r \leq \infty$ and $d_l \geq d_r$ (corresponding to $63.4° \leq \theta \leq 90°$), the 5×5 filter matrix is the matrix of (a) with r replaced by 1/r and the matrix reflected across its lower-left to upper-right diagonal.

(e) For $0 \leq r \leq 1/2$ and $d_r \geq d_l$ (corresponding to $0 \geq \theta \geq -\arctan(1/2)=-26.6°$), the 5×5 filter matrix is the matrix of (a) vertically reflected; that is:

$$M[n,m](j,k) = (1/16)\begin{bmatrix} 0 & 0 & 0 & 0 & 0 \\ 2(2r) & 4r & 0 & 0 & 0 \\ 2(1-2r) & 4(1-r) & 4 & 4(1-r) & 2(1-2r) \\ 0 & 0 & 0 & 4r & 2(2r) \\ 0 & 0 & 0 & 0 & 0 \end{bmatrix}$$

(f) For $1/2 \leq r \leq 1$ and $d_r \geq d_l$ (corresponding to $-26.6° \geq \theta \geq -45°$), the 5×5 filter matrix is the matrix of (b) vertically reflected.

(g) For $1 \leq r \leq 2$ and $d_r \geq d_l$ (corresponding to $-45° \geq \theta \geq -63.4°$), the 5×5 filter matrix is the matrix of (f) with r replaced by 1/r and the matrix reflected across its lower-left to upper-right diagonal.

(h) For $2 \leq r \leq \infty$ and $d_r \geq d_l$ (corresponding to $-63.4° \geq \theta \geq -90°$), the 5×5 filter matrix is the matrix of (e) with r replaced by 1/r and the matrix reflected across its lower-left to upper-right diagonal.

(3) Apply the filter defined in step (2) with a weighting dependent upon the edge intensity to the image. In particular, first filter the input image pixel p(n,m) with the 5×5 filter M[n,m] computed in step (2) to yield q(n,m):

$$q(n,m)=\Sigma_{-2\leq j\leq 2,-2\leq k\leq 2}M[n,m](j,k)p(n+j,m+k)$$

Then output the weighted sum of p(n,m) and q(n,m) as the new, filtered image $p^{new}(n,m)$, using the edge intensity I(n,m) computed in step (1):

$$p^{new}(n,m)=\alpha I(n,m)q(n,m)+[1-\alpha I(n,m)]p(n,m)$$

where α is a user-defined parameter reflecting the desired filtering strength and the size of I(n,m). When α I(n,m) is greater than 1, saturation at α I(n,m)=1 could be used. For example, with p(n,m) representing luminance values in the range 0 to 255 and with an edge at p(n,m) having a discontinuity of about 100, I(n,m) may be on the order of 1000, and so α may be on the order of 0.001.

The relatively small 5×5 filter leads to two benefits: (i) the buffer memory containing filtered pixels not yet written back to image memory need only hold two rows plus two pixels, and (ii) the summations of steps (1)-(3) have at most 20 nonzero terms.

3. Alternative Preferred Embodiment

An alternative preferred embodiment includes the case of RGB images. A section 2 filter can be applied to each of the R, G, and B elements separately. For the Y—Cb—Cr format, the filtering is not straight forward, because the resolution of the chroma is usually lower than that of the luminance. In the case of 4:2:0 video images, the a(j,k) and b(j,k) matrices used in the chroma estimation of the slope can be replace with $$a(j,k) = \begin{bmatrix} 1 & 2 & 1 \\ 1 & 2 & 1 \end{bmatrix}$$

and $$b(j,k) = \begin{bmatrix} 1 & 1 \\ 1 & 1 \end{bmatrix}$$

and the 5×5 filter matrix becomes a 3×3 filter matrix:

$$M = (1/4)\begin{bmatrix} 0 & 0 & r \\ 1-r & 2 & 1-r \\ r & 0 & 0 \end{bmatrix}$$

4. Alternative Smoothing Preferred Embodiment

The preferred embodiment of section 2 could be modified to use different smoothings parallel to the edges. In particular, if the smoothing is [1,2,4,2,1] rather than [2,4,4,4,2], then the 5×5 matrix of case (a) would be:

$$M[n,m](j,k) = (1/10)\begin{bmatrix} 0 & 0 & 0 & 0 & 0 \\ 0 & 0 & 0 & 2r & 2r \\ 1-2r & 2(1-r) & 4 & 2(1-r) & 1-2r \\ 2r & 2r & 0 & 0 & 0 \\ 0 & 0 & 0 & 0 & 0 \end{bmatrix}$$

and analogously for cases (b)-(h).

5. Experimental Results

FIG. 3a shows black lines on white background with various slope angles, and FIG. 3b shows the results of filtering with the preferred embodiment of section 2 pixel values in the range 0-255 and α=0.02 (strong filtering). Note that the lines with slope angles of 45° and 90° are not affected by the filtering, whereas the bumps in the lines with angles between 45° and 90° are significantly smoothed.

Because a line with slope angle 90° has no artifacts, the filtering ideally should have no effect, and the preferred embodiment is consistent with this.

Artifacts in lines with slope angle of 45° are often not visible or not annoying to human perception. Thus these lines can be output without filtering; otherwise, clearness may be degraded. On the other hand, the lines with slope angles between 45° and 90° are smoothed by the filter Because the bumps in these lines are visible and often degrade image quality, ideally these bumps are reduced. Also, the edges of the lines are not too blurred by the preferred embodiment filtering, despite the smoothness.

6. Modifications

The preferred embodiments may be modified in various ways while retaining one or more of the features of filtering derived from neighboring edge intensity and slope.

For example, the 5×5 size of the neighborhood could be varied to 3×3 or 7×7 or other (non-symmetrical) sizes. The partitioning of the angle into 8 intervals could be replaced by a finer partitioning (more useful with larger filter neighborhoods) or coarser partitioning (and more nonzero filter matrix elements). The weighting matrices a(j,k) and b(j,k) could be varied, and the filter matrix M[n,m](j,k) could vary and also adjust to the size of the neighborhood.

What is claimed is:

1. A method of image filtering, comprising:
   (a) computing edge intensity and direction for each pixel in an image;
   (b) filtering said image with a filter which, for each pixel, smoothes in a direction parallel to the edge found in step (a) for said each pixel;
   (c) interpolating said image and said filtered image from step (b) wherein said interpolating at said each pixel depends upon said intensity found in step (a).

2. The method of claim 1, wherein:
   (a) said computing of step (a) of claim 1 includes
   (i) computing variations in pixel values for horizontal, vertical, and diagonals at said each pixel; and
   (ii) computing edge direction and intensity from said variations of (i).

3. The method of claim 1, wherein:
   (a) said filter of step (b) of claim 1 for said each pixel is a rotation according to said edge direction of step (a) of claim 1 of a fixed filter.

4. The method of claim 1, wherein:
   (a) said filter of step (b) of claim 1 for said each pixel is a matrix which depends upon $r=d_x/d_y$, with $d_x$ is a measure of variation in the x-direction at said each pixel and $d_y$ is a measure of variation in the y-direction at said each pixel.

5. The method of claim 1, wherein:
   (a) said image is a color channel of a color image.

* * * * *